May 29, 1928.  F. R. PORTER  1,671,255
INTERNAL COMBUSTION ENGINE
Filed Nov. 25, 1924
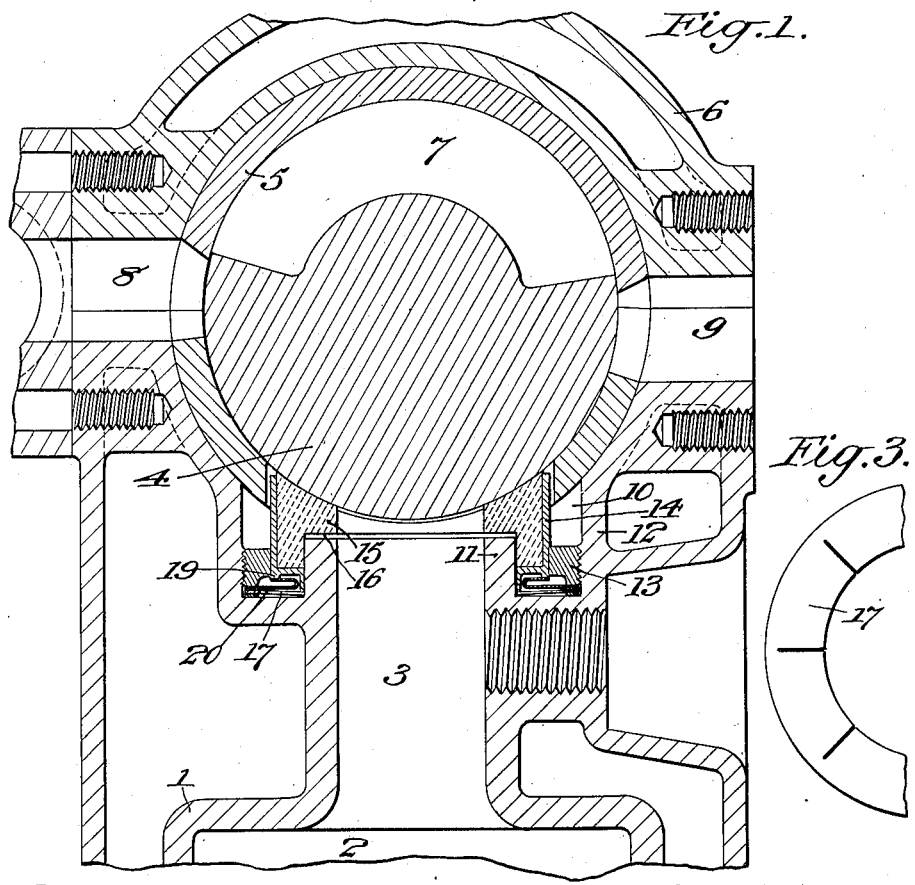
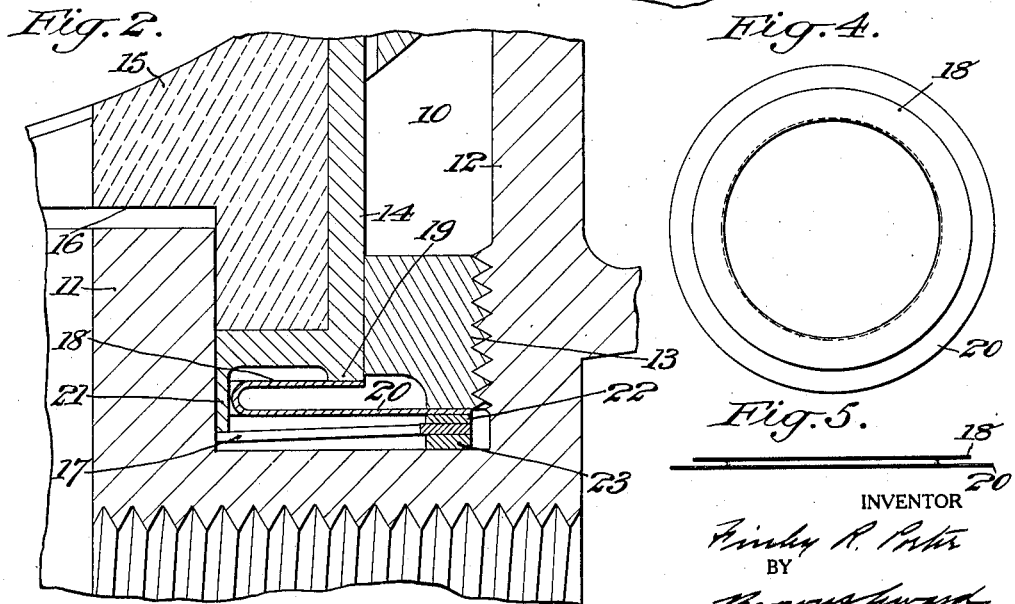
INVENTOR
Finley R. Porter
BY
ATTORNEYS Patented May 29, 1928.

1,671,255

UNITED STATES PATENT OFFICE.

FINLEY R. PORTER, OF NEW YORK, N. Y., ASSIGNOR TO PORTER ENGINE DEVELOPMENT, INC., OF NEW YORK, N. Y., A CORPORATION OF NEW YORK.

INTERNAL-COMBUSTION ENGINE.

Application filed November 25, 1924. Serial No. 752,158.

My invention relates to internal combustion engines and is shown in connection with an internal combustion engine of the rotary valve type in which the cylinder has a common inlet and discharge port, the valve chest has separate inlet and discharge ports and the valve has a peripheral bridge port located in the same plane as the cylinder and valve chest ports.

The object of my invention is to provide a novel packing engaging the valve around the cylinder port for preventing leakage, for ensuring the proper lubrication of the parts, and for providing sufficient pressure of the sealing ring on the valve to obtain a gas tight engagement without too much friction.

A practical embodiment of my invention is represented in the accompanying drawings, in which:

Fig. 1 represents a vertical cross section through so much of an internal combustion engine of the rotary valve type as includes my invention.

Fig. 2 represents an enlarged detail cross section at the cylinder port.

Fig. 3 represents a fragmentary plan view of the packing advancing spring.

Fig. 4 represents a plan view of the compound diaphragm.

Fig. 5 represents an edge view of the same.

The cylinder is denoted by 1, the combustion chamber by 2 and the cylinder port by 3. The valve 4 is rotatably mounted in the sleeve 5 within the bore of the valve chest 6, which valve is provided with a peripheral bridge port 7. The valve chest is provided with a motive fluid inlet port 8 and an exhaust port 9 opening through the bearing sleeve 5 to the face of the valve 4. The ports 3, 7, 8 and 9 are all located in the same plane.

The cylinder 1 is provided with an annular packing chamber 10 surrounding the port 3 between the inner and outer walls 11 and 12 and opening to the face of the valve 4. Within this chamber 10 I locate a ring 13 which has a screw-threaded engagement with the outer wall 12 of the packing chamber 10. A packing is also located within the chamber 10, which packing surrounds the cylinder port and is herein shown as comprising an annular holder 14 and a removable sealing ring 15, which sealing ring is composed of an oil impregnated self-lubricating bearing material such, for instance, as "Genalite." This sealing ring has an internal annular shoulder 16 overlapping and spaced from the inner wall 11 to provide a space in open communication with the cylinder port 3.

The means which I have shown for pressing the packing upwardly into the required frictional engagement with the face of the valve, to prevent leakage thereby, comprises a spring 17 and a compound diaphragm, both located in the chamber 10. The inner edge of the upper wall 18 of the compound diaphragm is engaged with the flange 19 on the bottom of the sealing ring holder 14, said edge being preferably permanently joined to the said flange as, for instance, by welding, to form a gas tight joint. The lower wall 20 of the compound diaphragm projects outwardly beyond the outer wall and has its edge clamped between the bottom of the ring 13 and the bottom of the chamber to form a gas tight joint.

The spring 17 comprises an interiorly pronged washer of resilient material, the outer edge of which is clamped between the ring 13 and the bottom of the chamber 10 and the prongs of which spring bear against the annular flange 21, projecting from the bottom of the holder 14. The prongs of this spring 17 are deflected sufficiently to press the packing upwardly against the face of the rotary valve with a force sufficient to hold the packing against the valve during the induction stroke of the engine.

Suitable spacing washers 22, 23 are provided for properly spacing the diaphragm from the spring and the spring from the bottom of the chamber 10.

From the above description it will be seen that by providing the sealing ring of oil impregnated self-lubricating bearing material with an internal annular shoulder overlapping and spaced from the inner wall of the packing chamber, a surface is provided against which gas pressure within the cylinder port will exert its effect to force the packing toward the face of the valve, separate spring means being also provided for holding the packing against the valve. Also any gas pressure leakage past the packing between it and the inner wall of the chamber is trapped in the chamber because of the gas tight joints between the edges of the upper and lower members of the compound diaphragm with the packing and cylinder respectively.

It is evident that various changes may be resorted to in the construction, form and arrangement of the several parts without departing from the spirit and scope of my invention; hence, I do not wish to limit myself to the particular embodiment herein shown and described, but

What I claim is:—

1. In an internal combustion engine, a rotary valve, a cylinder having a port and a packing chamber surrounding it, a packing around said port within said chamber, said packing having a bore forming a continuation of the cylinder port and also having an internal annular shoulder overlapping and spaced from the upper end of the inner wall of said chamber to form a surface exposed to gas pressure within said port tending to force the packing toward the valve, and spring means for holding the packing in engagement with the valve.

2. In an internal combustion engine, a rotary valve, a cylinder having a port and a packing chamber surrounding it, a packing around said port within said chamber, said packing including a sealing ring of oil impregnated self-lubricating bearing material having a bore forming a continuation of the cylinder port and also having an internal annular shoulder overlapping and spaced from the upper end of the inner wall of said chamber, forming a surface exposed to gas pressure within said port tending to force the packing toward the valve, and spring means for holding the packing in engagement with the valve.

3. In an internal combustion engine, a rotary valve, a cylinder having a port and a packing chamber surrounding it, a packing around said port within said chamber, a compound diaphragm in said chamber having outwardly directed upper and lower substantial parallel members, the edge of the upper member being permanently joined to said packing with a gas tight joint, a spring washer located in said chamber for holding the packing in engagement with the valve, and a ring having a threaded engagement with the outer wall of said chamber for clamping the washer and the edge of the lower member of the diaphragm to the cylinder with a gas tight joint.

4. In an internal combustion engine, a rotary valve, a cylinder having a port and a packing chamber surrounding it, a packing around said port within said chamber, comprising a sealing ring of oil impregnated self-lubricating bearing material having a bore forming a continuation of the cylinder port and having an inner annular shoulder overlapping and spaced from the upper end of the inner wall of said chamber to form a surface exposed to gas pressure within said port tending to force the packing toward the valve, a holder for said sealing ring, a compound diaphragm in said chamber having outwardly directed upper and lower substantially parallel members, the edge of the upper member being permanently joined to said holder with a gas tight joint, a spring washer in said chamber engaging the holder for holding the packing in engagement with the valve, and a ring having a threaded engagement with the outer wall of said chamber for clamping the washer and edge of the lower member of the diaphragm to the cylinder with a gas tight joint.

In testimony, that I claim the foregoing as my invention, I have signed my name this 21st day of November 1924.

FINLEY R. PORTER.